July 15, 1958
P. M. BUCKLES
2,842,829
MACHINE FOR MAKING VINE SUPPORTING NETS
Filed Nov. 28, 1955
4 Sheets-Sheet 1
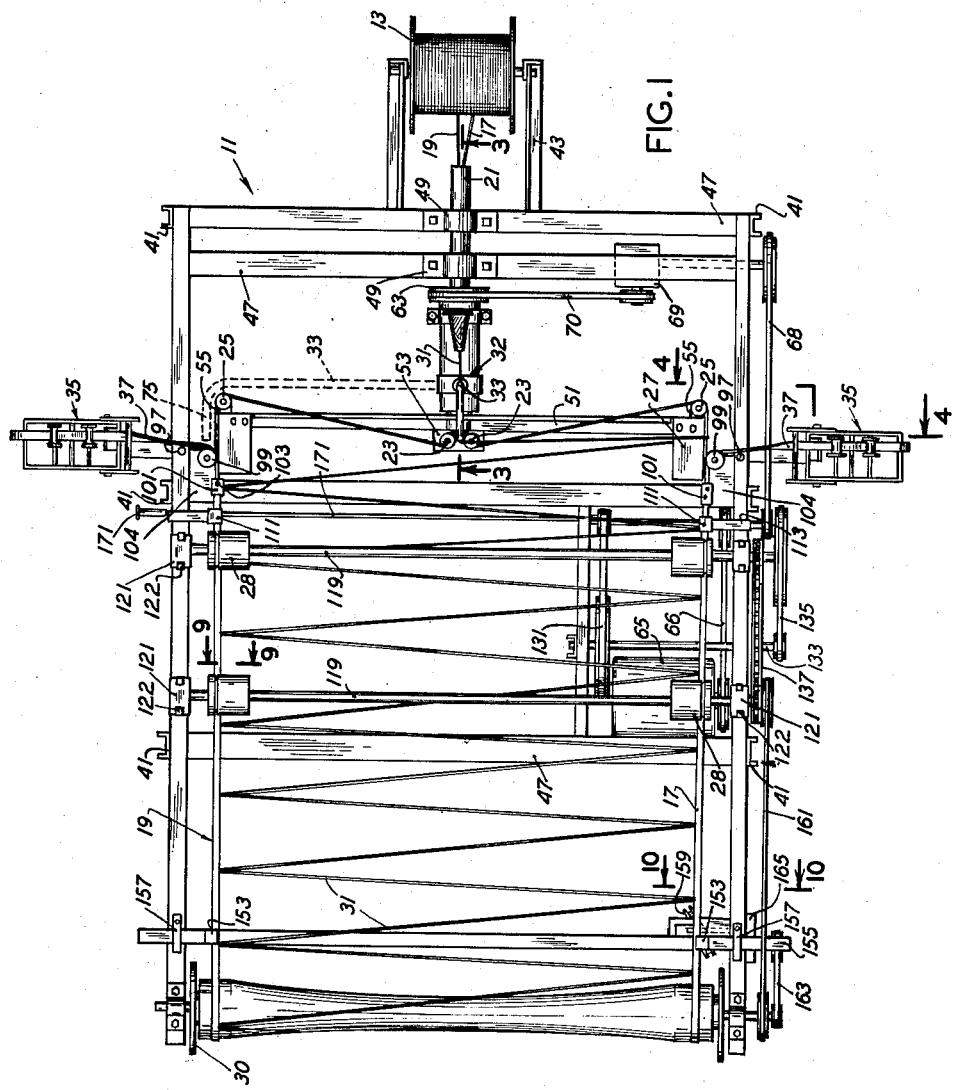
INVENTOR
PAUL M. BUCKLES
BY
*Buckhorn and Cheatham*
ATTORNEYS July 15, 1958
P. M. BUCKLES
2,842,829
MACHINE FOR MAKING VINE SUPPORTING NETS
Filed Nov. 28, 1955
4 Sheets-Sheet 2
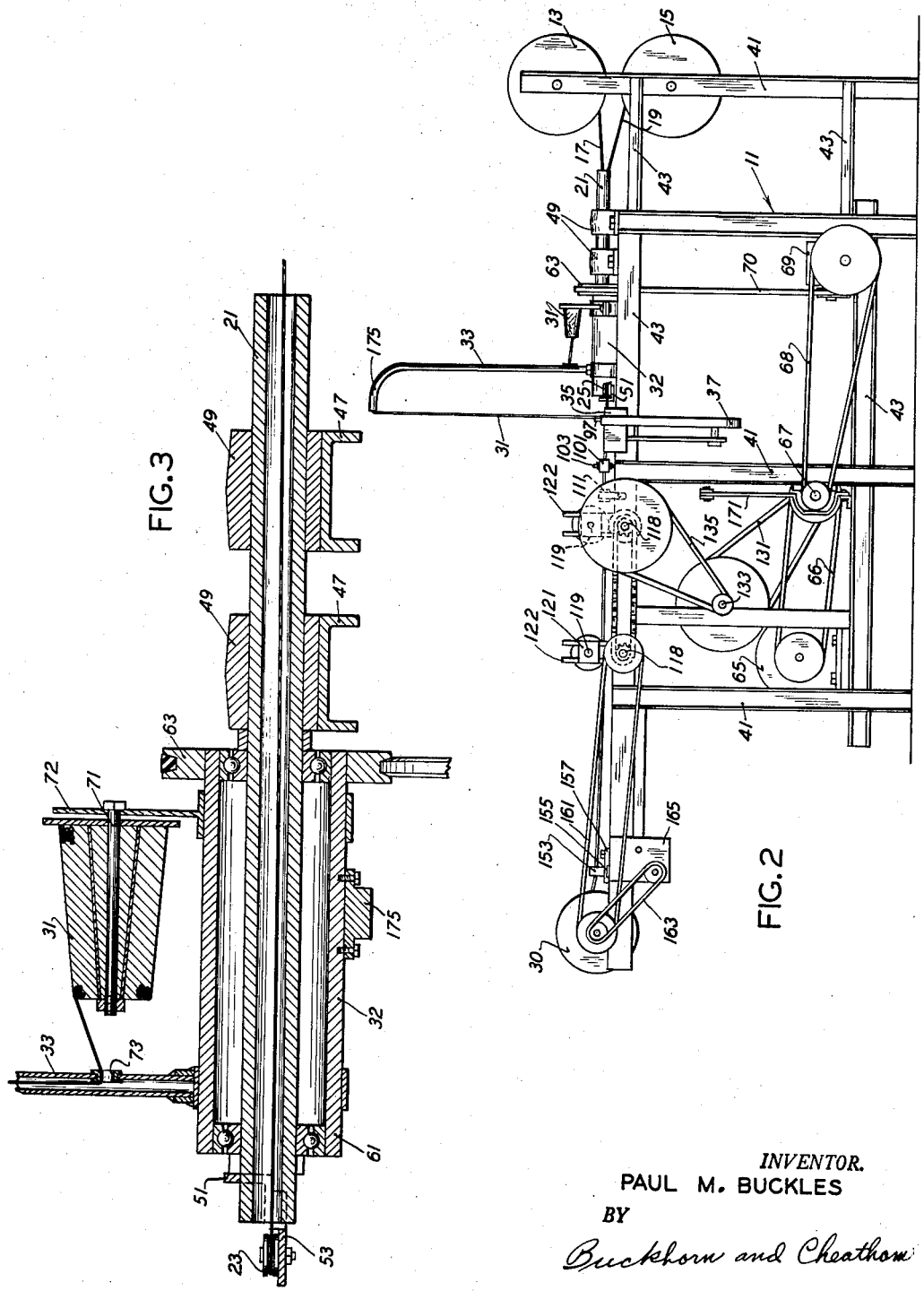
INVENTOR.
PAUL M. BUCKLES
BY
*Buckhorn and Cheatham*
ATTORNEYS July 15, 1958 P. M. BUCKLES 2,842,829
MACHINE FOR MAKING VINE SUPPORTING NETS
Filed Nov. 28, 1955 4 Sheets-Sheet 3

INVENTOR.
BAUL M. BUCKLES
BY
Buckhorn and Cheatham
ATTORNEYS

July 15, 1958 P. M. BUCKLES 2,842,829
MACHINE FOR MAKING VINE SUPPORTING NETS
Filed Nov. 28, 1955 4 Sheets-Sheet 4
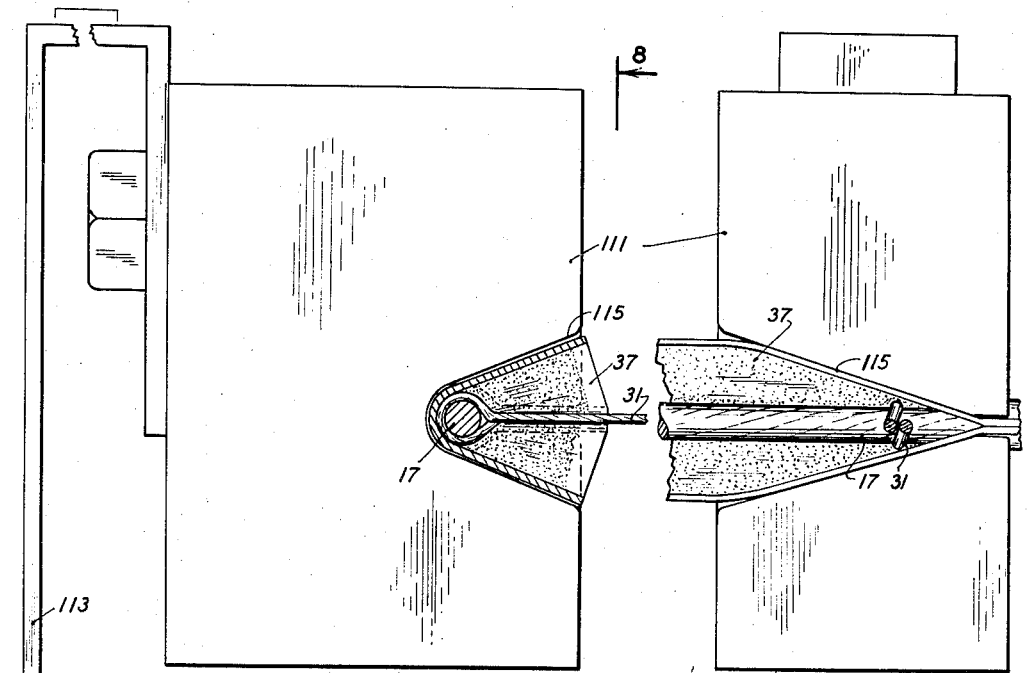
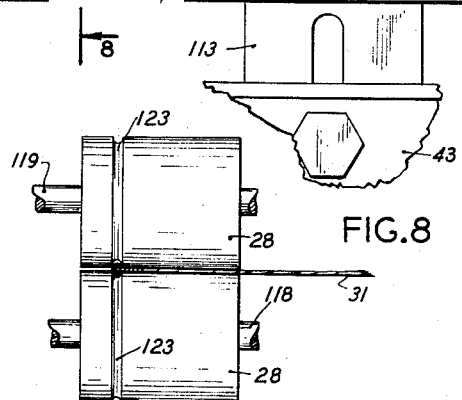
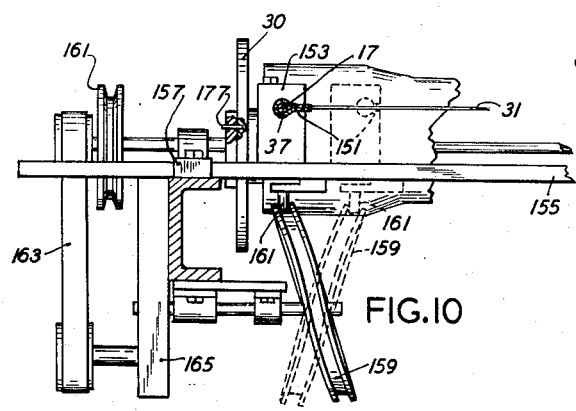
INVENTOR.
PAUL M. BUCKLES
BY
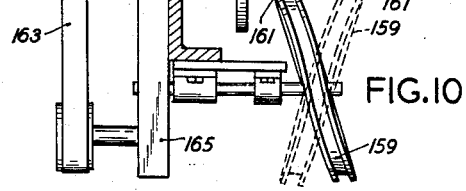
ATTORNEYS United States Patent Office 2,842,829
Patented July 15, 1958

2,842,829
MACHINE FOR MAKING VINE SUPPORTING NETS

Paul M. Buckles, Portland, Oreg.

Application November 28, 1955, Serial No. 549,234

5 Claims. (Cl. 28—1)

This invention relates to a machine for making vine supporting nets.

Heretofore, vine supporting nets have been fabricated in the field such as by stringing twine or string back and forth in zig-zag fashion between a pair of horizontally extending lines. In my copending application entitled "Prefabricated Vine Supporting Net," Serial No. 481,801, filed January 14, 1955, I have disclosed a net which is fabricated in a shop and erected, instead of being fabricated, in the field. My prior application also discloses a method of fabricating the net, and the present application is a continuation of my prior application insofar as the method is concerned.

It is a main object of the present invention to provide a method and machine for making a vine supporting net, particularly a vine supporting net of the type disclosed in my copending application.

The machine of the present invention is characterized by including a frame which supports a pair of reels from which two lines are drawn and maintained in a desired spaced parallel relationship. A rotary wrapping head is mounted on the frame and carries a supply of string and is operable to wrap the string around the lines as the lines are moved along predetermined paths to thus wrap the string in zig-zag fashion about the line. Also mounted on the frame are mechanisms for applying and fastening a binding tape or strip on each line to hold the string and line together and maintain the zig-zag pattern, and thus form a net.

Various other objects of the present invention will be apparent from the following description taken in connection with the accompanying drawings, wherein:

Fig. 1 is a plan view of a machine embodying the concepts of the present invention;

Fig. 2 is a side elevational view of the machine;

Fig. 3 is an enlarged sectional view taken along line 3—3 of Fig. 1 showing the construction of the wrapping head;

Fig. 7 is an enlarged sectional view in elevation showing another part of a tape folding mechanism;

Fig. 8 is a view taken in the direction of the arrows 8—8 in Fig. 7;

Fig. 9 is an enlarged view taken along line 9—9 of Fig. 1 showing the drive rolls; and Fig. 10 is an enlarged fragmentary view in elevation taken along lines 10—10 of Fig. 1 showing part of the level wind mechanism.

General description

Figure 4:
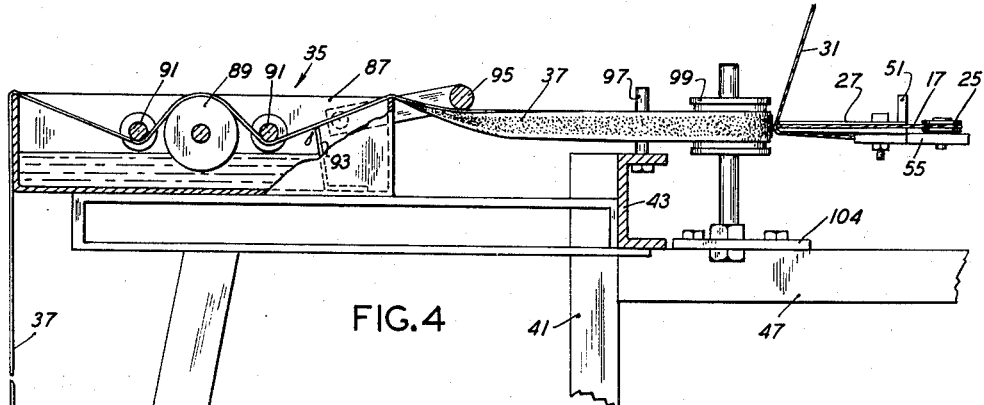
Fig. 4 is an enlarged sectional view taken along line 4—4 of Fig. 1 showing part of the mechanism for applying tape to the lines.

Referring to the accompanying drawings, and particularly to Figs. 1 and 2, the machine includes an open framework 11 on which is mounted a pair of supply reels 13 and 15 off of which are drawn lines 17 and 19. The lines are threaded through a fixed hollow shaft 21 on the frame and then are guided by spools 23 and 25 outwardly and then in spaced parallel relation along fixed mandrels 27. Two sets of drive rolls 28 function to draw the lines off of the supply reels through the shaft 21 and over the mandrels 27 and through tape folding mechanisms, the purpose of which will presently appear. From the mechanisms, the lines pass between the drive rolls 28 and then are wound up on a reel 30.

A supply of string 31 is carried by a rotary wrapper head generally entitled 32 which includes a wrapping tube 33 through which the string 31 passes and by which the string is wrapped around the mandrels 27 and thus around the lines 17 and 19, during movement of the lines along the mandrels, thus to apply the string in zig-zag fashion to the lines. A gummed tape supply 35 is provided for and supplies tape to each line. The folding mechanisms function to fold the tape over the lines to secure them in place and maintain the zig-zag pattern of the string relative to the lines and thereby form a net.

Specific description

The frame 11 includes legs 41 (Fig. 2), stringers 43, and cross-pieces 47 (Fig. 1). The hollow shaft 21 through which lines 17 and 19 pass, is fixedly mounted on the frame by a pair of blocks 49 and has a portion projecting in cantilever fashion forwardly or to the left as the parts are depicted in Figs. 2 and 3. On the end of this cantilever portion, a pair of laterally extending cantilever arms 51 (Fig. 1) are fixedly connected. The small guide sheaves 23 are mounted on the inner ends of arms 51 by means of a plate 53, and the sheaves 25 and the mandrels 27 are mounted on the outer ends of the arms.

The wrapper head 32 includes a sleeve 61 (Fig. 3) rotatably mounted on the shaft 21 and fixedly carrying a pulley 63 by which the wrapper head is driven by a drive arrangement from a motor 65 (Fig. 2). The drive arrangement includes a belt drive 66 from the motor to a jackshaft 67, and a belt drive 68 from the jack shaft to a speed reduction unit 69, which drives pulley 63 by means of a belt 70.

The spool of string 31, which is mounted on the wrapper head 32, may be of any suitable type, but preferably is of the tapered form shown so as to enable the string to be removed from the spool directly off the smaller end thereof. The spool is carried in a horizontal position extending longitudinally of the machine by means of a fixed shaft 71 (Fig. 3) mounted by a bracket 72 on wrapper head 32. A counterbalance weight 175 for the spool of string is provided on sleeve 61.

The string 31 is led from the spool through an opening 73 in the tube 33 (Fig. 3) which is fixed at its inner end to the wrapper head sleeve, the outer end of the tube being bent at 75 (Figs. 1 and 2), to overlap the mandrels 27 outwardly of the mandrels. Thus as the wrapper head rotates, it wraps string 31 around the mandrels 27.

Figure 5:
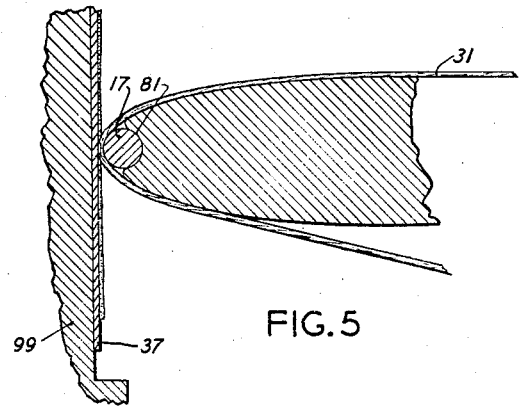
Fig. 5 is an enlarged fragmentary sectional view in elevation showing more fully the construction of a mandrel.

Each of the mandrels has a semicircular groove 81 (Fig. 5) formed in the outer edge thereof to receive the associated line and thus the line projects outwardly beyond the associated mandrel. Therefore, as the wrapper head wraps string around the mandrels, the string is also wrapped around the two lines 17 and 19, and because the frictional force between string and the lines is greater than that between the string and the mandrels, the lines carry the string along forwardly therewith. It is pointed out that there is sufficient resistance to drawing the string 31 off of the spool and through the tube 33 as to cause the string to be wound about the mandrel and the lines 17 and 19 with the desired tautness.

A roll 85 of tape 37 is rotatably carried by the frame 11 (Fig. 4) adjacent each side of the frame, each tape being led upwardly and over into its own glue pot 87. Each glue pot and roll of tape 85 constitute a gummed tape supply 35. Each glue pot contains an applicator roll 89 and a pair of guide rolls 91 which function to apply a film of adhesive material to the central or medial portion of one side of the tape 37, leaving narrow marginal portions of said one side of the tape free of adhesive material for a purpose to presently appear. A wiper element 93 in the glue pot functions to scrape excess glue from the tape.

The tape 37 is led from the glue pot under a horizontal guide rod 95 and past a vertical guide post 97 on the frame and around a guide spool 99 rotatably supported on the frame. As shown in Fig. 4, the tape is twisted 90 degrees from the horizontal position it occupies in the glue pot to the vertical position it occupies around the spool 99.

As shown in Fig. 1, spools 99 are disposed just forwardly of the points of application of the string 31 around the mandrels 27 and the lines 17 and 19, and are disposed next to the outer edges of the mandrels. Thus, just after the string 31 has been wrapped around the lines, the lines carry the string against the adhesive coated side of the tapes 37.

Figure 6:
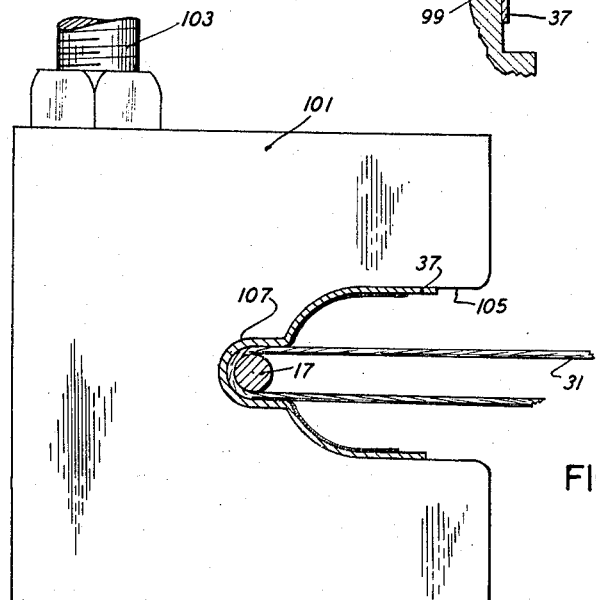
Fig. 6 is an enlarged view in elevation showing part of a tape folding mechanism.

Just forwardly of each spool 99 and the associated mandrel 27 is the folding or forming mechanism including a first former block 101 (Fig. 6) mounted by means of a bolt 103 on a plate 104 (Fig. 4) upon which the associated spool 99 is also mounted. Each former block 101 (Fig. 6) has a deep groove 105 formed on its inner face, the groove being of generally U-shaped configuration, and the bottom wall of this groove being formed with a smaller U-shaped groove 107. The width of the groove 107 is of slightly greater diameter than that of the associated line. The former blocks 101 function to fold the central portion of the tape 37 in firm embracing relationship with the lines 17 and 19 to assure a good bond between the tapes and the lines and the tapes and the string, as is most clearly apparent from Fig. 6.

Just after leaving former blocks 101, the thus joined tapes and lines, that is, the edges of the net being produced, are fed through a pair of second former blocks 111 (Figs. 7 and 8) which constitute another part of the folding mechanisms and are mounted on the frame by suitable brackets 113. Each block 111 has a deep generally V-shaped groove 115 on its inner face, each groove 115 tapering from left to right, as the parts are shown in Fig. 8, to terminate in a portion having a cross-sectional configuration conforming substantially to that of the finished form of the margin of the net. Each block 111 thus functions to continue the folding operation on the associated tape and cause the tape to be folded over to the position shown in Fig. 8 with the margins of the tape pressed together to form a bond therebetween.

It is here pointed out that the application of glue to the medial or central portions of the tape 37 is sufficiently wide so that substantial portions of the margins of the tape will carry glue and thus be secured together. However, narrow extreme marginal portions do not contain glue and hence are not secured together. With this arrangement, there is assurance that the adhesive material will not be squeezed out of the tapes and thus coat the operating parts of the machine.

It has been found that by suitable adjustment of the various parts of the machine, that the adhesive material can be applied to the tapes in such quantities that when the tapes are folded and pressed together, a small quantity of the glue is squeezed slightly outwardly and just between the uncoated marginal portions of the tapes so that even they are secured together. However, this is not necessary to the proper formation of a net.

Just after leaving the second blocks 111, the margins of the net are fed between the two sets of drive rolls 28. Each set of drive rolls includes an upper and a lower pair of rolls, each lower pair being mounted on a common shaft 118 (Fig. 2) which is journaled in the frame of the machine, and each upper pair being mounted on a common shaft 119 which is carried by guide blocks 121 (Fig. 2). The guide blocks are slidably mounted in vertical guides 122 carried by the frame of the machine. Thus the upper pair of rollers of each set is gravity weighted.

Each roll 28 has annular semicircular grooves 123 (Fig. 9) formed therein, the groove of each upper and the adjacent lower roll registering with one another as shown in Fig. 9. The associated margin of the net is fed through the drive rolls with the part containing the line passing through the grooves 123. The grooves 123 are just large enough to accommodate the covered lines 17 and 19, and the upper rolls have considerable weight so that they also function as pressure rolls to apply considerable pressure to the margins of the net to make certain of a good bond between the tapes and the lines and the string.

The rolls 28 have another function and that is to maintain the lines 17 and 19 and the tapes 37 within the former blocks 101 and 111 to assure that these blocks properly fold the tape over the line. The drive rolls 28 are capable of so holding the lines and tape because the semicircular grooved portions at 123 prevent inward movement of the margins of the net.

The lower rolls 28 are driven from the jack shaft 67 (Fig. 2) by a drive arrangement including a belt drive 131 from the jack shaft to a countershaft 133, and by a belt drive 135 from the countershaft to the lower shaft of the first set of rolls. The lower shaft of the second pair of rolls is driven from the lower shaft of the first set by a chain-drive 137. Thus the rolls 28 function to pull the lines 17 forwardly through the machine.

After leaving the rolls 28, the margins of the net are fed through undercut notches 151 formed in blocks 153. The notches are formed to fit the cross-sectional contour of the margins of the net for holding the net in a transverse direction for reasons to presently appear. The blocks 153 are mounted on a bar 155, which in turn is mounted for reciprocating movement transversely on the frame 11 by bearing blocks 157. A cam 159 (Fig. 10) is rotatably mounted on the frame and engages a pin 161 fixed to the bar 155, and functions when rotated to reciprocate the bar, thus moving the net back and forth so that the margins of the tape do not directly overlap one another during the winding of the net around the reel 30. The margins of the net are the thickest portions thereof, and if these margins were merely rolled up on the reel, they would build up and then collapse and thus make for irregular winding of the net on the reel and also render it difficult to unwind the net off the reel.

The cam 159 is driven in the following manner. The reel 30 is driven by a belt drive 161 from the adjacent drive roller shaft 118, and the cam 159 is driven by a belt drive 163 from the reel 30 through a speed reduction gear box 165 mounted on the frame. The belt of the drive 161 rather loosely engages the pulley on the reel 30 so that a friction drive is provided. Thus as the net builds up on the reel, the belt slips and the reel continues to wind up the net while maintaining the net reasonably taut. A conventional clutch arrangement 171 (Fig. 2) is provided for the jack shaft 67 to engage or disengage the motor 65 from the driven parts of the machine.

The reel 30 is removably held in place by pins 177 and thus when one reel is filled, it may be removed and replaced with an empty reel.

The string, as well as the lines 17 and 19, may be considered broadly as flexible elements.

Having described the invention is what is considered to be the preferred embodiment thereof, it is desired that it be understood that the invention is not to be

I claim:

1. A machine for making vine supporting nets comprising means for feeding two flexible elements along in spaced parallel relation, means for wrapping a third flexible element around said two flexible elements from a fixed location to thus apply the third element in zig-zag fashion to said two elements, means for folding a binding tape in embracing fashion to each of said two elements after said third element has been wrapped therearound, and means for effecting the securing of the folded portions of the tape together.

2. A machine for making vine supporting nets comprising means providing a pair of oppositely facing work-supporting surfaces, means for feeding two flexible elements along in parallel relation adjacent the outer faces of said surfaces, means for wrapping a third flexible element around said two flexible elements at the location of said work surfaces, means for applying a tape in folded embracing fashion to each of said two elements at the associated work surface after application of said third element to said two elements, and means for effecting the securing of the folded portions of each tape together.

3. A machine for making vine supporting nets comprising means for feeding two flexible elements along in closely adjacent relation and then spreading said elements apart and then constraining said elements to move in spaced parallel relation, means rotatable about the closely adjacent portions of said two elements for wrapping a third element around the widely spaced portions of said two elements, and means for effecting the securing of said third element to said two elements locally of the places of contact therebetween.

4. A machine for making vine supporting nets comprising means for feeding two flexible elements along in closely adjacent relation and then spreading said elements apart and then constraining said elements to move in spaced parallel relation, means rotatable about the closely adjacent portions of said two elements for wrapping a third element around the widely spaced portions of said two elements, and means for securing said third element to said two elements locally of the places of contact therebetween, the last named means including a mechanism for applying an adhesive tape to each of said two elements after said third element has been wrapped therearound to secure said third element to each of said two elements.

5. A machine for making vine supporting nets comprising a frame, a hollow horizontal member fixedly mounted on said frame with its axis horizontal, means for feeding a pair of flexible elements through said hollow member and then guiding said flexible elements outwardly and then along in relatively widely spaced parallel relation, a pair of mandrels engaging said flexible elements at the widely spaced portions thereof and being mounted in cantilever fashion on said member, a wrapper head rotatably mounted on said member and having means for wrapping a third flexible element around said two flexible elements at the location of said mandrels, and means for securing said third element to said two elements at the place of contact therebetween.

References Cited in the file of this patent
UNITED STATES PATENTS

| | | |
|---|---|---|
| 1,970,599 | Franke | Aug. 21, 1934 |
| 2,272,869 | Herzog | Feb. 10, 1942 |
| 2,275,858 | Mallard | Mar. 10, 1942 |
| 2,541,302 | Slangal | Feb. 13, 1951 |
| 2,641,084 | Estes | June 9, 1953 |
| 2,659,956 | Lilienfeld | Nov. 24, 1953 |
| 2,753,661 | Wiemers | July 10, 1956 |